United States Patent
Nagasaki

(10) Patent No.: US 8,143,984 B2
(45) Date of Patent: Mar. 27, 2012

(54) LINEAR SOLENOID

(75) Inventor: Kanehisa Nagasaki, Obu (JP)

(73) Assignee: Denso Corporation, Kariya (JP)

( * ) Notice: Subject to any disclaimer, the term of this patent is extended or adjusted under 35 U.S.C. 154(b) by 205 days.

(21) Appl. No.: 12/688,385

(22) Filed: Jan. 15, 2010

(65) Prior Publication Data

US 2010/0182112 A1 Jul. 22, 2010

(30) Foreign Application Priority Data

Jan. 20, 2009 (JP) .................................. 2009-9917

(51) Int. Cl.
*H01F 3/00* (2006.01)
*H01F 7/08* (2006.01)

(52) U.S. Cl. ........ 335/281; 335/220; 335/249; 335/251; 335/255; 335/258; 335/261; 335/262; 335/270; 335/273; 335/279

(58) Field of Classification Search .................. 335/220, 335/249, 251, 255, 258, 261–263, 270, 273, 335/279, 281

See application file for complete search history.

(56) References Cited

U.S. PATENT DOCUMENTS

| | | | | |
|---|---|---|---|---|
| 2,407,963 | A | * | 9/1946 | Persons .......................... 335/261 |
| 3,070,730 | A | * | 12/1962 | Gray et al. ..................... 335/229 |
| 4,046,244 | A | * | 9/1977 | Velazquez ................. 400/124.17 |
| 4,403,765 | A | * | 9/1983 | Fisher .............................. 251/65 |
| 4,644,311 | A | * | 2/1987 | Guery et al. ................... 335/230 |
| 4,971,116 | A | * | 11/1990 | Suzuki et al. ............. 137/625.65 |
| 5,848,613 | A | | 12/1998 | Sakaguchi et al. |
| 7,091,808 | B2 | | 8/2006 | Okubo |
| 7,280,021 | B2 | | 10/2007 | Nagasaki |
| 7,468,647 | B2 | | 12/2008 | Ishibashi et al. |
| 7,973,627 | B2 | * | 7/2011 | Yamagata et al. ............. 335/255 |
| 2004/0257185 | A1 | * | 12/2004 | Telep .............................. 335/220 |
| 2005/0061302 | A1 | * | 3/2005 | Tatsu et al. ...................... 123/520 |
| 2007/0236089 | A1 | | 10/2007 | Okubo |
| 2007/0257756 | A1 | * | 11/2007 | Matsumoto et al. ........... 335/229 |
| 2008/0246569 | A1 | * | 10/2008 | Bogdon et al. ................. 335/256 |

FOREIGN PATENT DOCUMENTS

JP 57020414 A * 2/1982

(Continued)

OTHER PUBLICATIONS

Japanese Office Action dated Jan. 11, 2011, issued in corresponding Japanese Application No. 2009-009917 with English Translation.

(Continued)

*Primary Examiner* — Mohamad Musleh
(74) *Attorney, Agent, or Firm* — Nixon & Vanderhye PC

(57) ABSTRACT

A linear solenoid has a first magnetic pulling portion for attracting a forward end of a plunger in a forward direction. The linear solenoid further has a second magnetic pulling portion at a rear end of the solenoid. A magnetic path portion is formed at the rear end of the solenoid and composed of a constant overlapping area and a temporal overlapping area. A plunger side-gap portion is formed at a rear end of the plunger so as to face to the overlapping areas in a radial direction. A first radial gap, which is formed between the constant overlapping area and the plunger side-gap portion, is made larger than a second radial gap, which is formed between the temporal overlapping area and the plunger side-gap portion.

10 Claims, 7 Drawing Sheets

FOREIGN PATENT DOCUMENTS

| | | |
|---|---|---|
| JP | 5-36520 | 2/1993 |
| JP | 9-144931 | 6/1997 |
| JP | 10-122415 | 5/1998 |
| JP | 10-231946 | 9/1998 |
| JP | 2003-120841 | 4/2003 |
| JP | 2003-134781 | 5/2003 |
| JP | 2006-46627 | 2/2006 |
| JP | 2007-103243 | 4/2007 |
| JP | 2008-185161 | 8/2008 |

OTHER PUBLICATIONS

Chinese Office Action dated Aug. 2, 2011, issued in corresponding Chinese Application No. 201010005401.8 with English Translation.

* cited by examiner (A>B)

LINEAR SOLENOID

CROSS REFERENCE TO RELATED APPLICATION

This application is based on Japanese Patent Application No. 2009-009917 filed on Jan. 20, 2009, the disclosure of which is incorporated herein by reference.

FIELD OF THE INVENTION

The present invention relates to a linear solenoid, a plunger of which is axially driven to move by electromagnetic force generated by an electromagnetic coil.

BACKGROUND OF THE INVENTION

A longer moving stroke, a higher output (a larger driving force), and a smaller size are required for a linear solenoid. The linear solenoid is known in the art, for example, as disclosed in Japanese Patent Publication No. 2006-46627, Japanese Patent Publication No. H9-144931, and Japanese Patent No. 3601554.

A linear solenoid of a related art will be explained with reference to FIG. 10.

The linear solenoid is composed of an electromagnetic coil 1 for generating electromagnetic force, a plunger 2 as a moving member, a magnetic pulling portion 6 for magnetically pulling one end of the plunger 2 to one of axial ends (a left-hand side in FIG. 10), and a magnetic path portion 11 through which magnetic flux passes in a radial direction of the plunger 2.

The plunger 2 is biased toward the other axial end (a right-hand side in FIG. 10) by a biasing member, such as a spring. Electromagnetic attracting force is generated at a main gap between the plunger 2 and the magnetic pulling portion 6 by electromagnetic force generated at the electromagnetic coil 1, so that the plunger 2 is moved toward the one axial end.

As explained above, higher output and further miniaturization are always required for the linear solenoid. The electromagnetic attracting force for attracting the plunger 2 in the axial direction is generated only at one axial end of the plunger 2 (that is, at the main gap). In addition, an outer diameter of the plunger 2 at the main gap (i.e. an electromagnetic force generating portion) is smaller than a minimum inner diameter of a bobbin 5 for the electromagnetic coil 1. Therefore, an outer peripheral length of the plunger 2 at a portion for receiving the electromagnetic attracting force is relatively short.

As a result, magnetic saturation may easily occur at the portion for receiving the electromagnetic attracting force in the above explained linear solenoid. It is, therefore, difficult to realize larger electromagnetic attracting force for the linear solenoid having a longer moving stroke of the plunger 2.

SUMMARY OF THE INVENTION

The present invention is made in view of the above problems. It is an object of the present invention to provide a linear solenoid, according to which larger electromagnetic attracting force is obtained for longer moving stroke of a plunger, and/or according to which a further miniaturization can be realized.

According to a feature of the present invention, a linear solenoid has a first magnetic pulling portion formed at a forward end of a solenoid housing for magnetically pulling a forward end of a plunger in a forward direction by magnetic force generated at an electromagnetic coil. The linear solenoid further has a second magnetic pulling portion for magnetically pulling a plunger side-gap portion, which is formed at a rear end of the plunger, in the forward direction.

The above linear solenoid generates magnetic pulling force not only at a main gap between the forward end of the solenoid housing and the forward end of the plunger, but also at a side gap which is formed between a magnetic path portion formed at a rear end of the solenoid housing and the plunger side-gap portion.

As above, a number of the portions, at which the magnetic pulling force in the axial direction is generated, is increased to two. Namely, the magnetic pulling force is generated at one axial end of the plunger in the conventional linear solenoid. According to the present invention, however, the magnetic pulling force is generated at both axial ends of the plunger. Therefore, a larger magnetic pulling force can be obtained even for the linear solenoid having a longer moving stroke of the plunger. In addition, the linear solenoid can be miniaturized, in the case that the same magnetic pulling force to the conventional linear solenoid is required.

According to another feature of the invention, the magnetic path portion has;

a constant overlapping area which overlaps with the plunger side-gap portion in the radial direction, when the plunger is in its rear-most position; and a temporal overlapping area which overlaps with the plunger side-gap portion in the radial direction, when the plunger is moved in the forward direction, wherein the temporal overlapping area is increased as the plunger is further moved in the forward direction.

In the linear solenoid, a first radial gap (A) is formed in the radial direction between the magnetic path portion of the constant overlapping area and the plunger side-gap portion, and a second radial gap (B) is formed in the radial direction between the magnetic path portion of the temporal overlapping area and the plunger side-gap portion, wherein the first radial gap (A) is made larger than the second radial gap (B).

According to such a structure, the magnetic pulling force is generated at the second radial gap for magnetically pulling the plunger side-gap portion in the forward direction, when the magnetic force is generated at the coil.

According to a further feature of the invention, the plunger side-gap portion is provided at a position, which is out of an axial-length area of a bobbin for the coil in the axial direction, and an outer diameter of the plunger side-gap portion is made to be equal to or larger than a minimum inner diameter of the bobbin.

Since the outer diameter of the plunger side-gap portion becomes larger, a peripheral length of the plunger side-gap portion becomes longer. As a result, the magnetic pulling force generated at the plunger side-gap portion can be increased, so that the output for the linear solenoid can be increased and/or the linear solenoid can be miniaturized.

According to a still further feature of the invention, the outer diameter of the plunger side-gap portion is made to be close to a maximum outer diameter of the bobbin.

According to such a feature, the plunger side-gap portion can be made larger, without making the outer diameter of the linear solenoid larger than that of the conventional solenoid. In addition, the magnetic pulling force generated at the plunger side-gap portion can be increased.

According to a still further feature of the invention, a projected portion is formed at the magnetic path portion of the temporal overlapping area, so that the plunger side-gap portion is magnetically pulled by the projected portion when the magnetic force is generated at the coil.

According to such a feature, since the plunger side-gap portion is magnetically pulled by the projected portion, a larger driving force in the axial direction is generated at the plunger side-gap portion. Therefore, the output for the linear solenoid can be increased and/or the linear solenoid can be miniaturized.

According to a still further feature of the invention, a tapered portion is formed at the magnetic path portion of the temporal overlapping area or at a forward end of the plunger side-gap portion, such that a thickness of the tapered portion in the radial direction is changed in the axial direction.

With such a tapered portion, a driving force in the axial direction, which is generated at respective stroke positions of the plunger, can be adjusted (increased or decreased). As a result, a larger magnetic pulling force can be obtained for the linear solenoid having a longer moving stroke of the plunger.

According to a still further feature of the invention, an outer diameter of the forward end of the plunger, which is magnetically pulled by the first magnetic pulling portion, is made to be equal to or larger than a minimum inner diameter of a bobbin for the coil.

As a result that the outer diameter of the forward end of the plunger, which is magnetically pulled by the first magnetic pulling portion, is made to be larger, the magnetic pulling force in the axial direction at the first magnetic pulling portion can be increased. Therefore, the output for the linear solenoid can be increased and/or the linear solenoid can be miniaturized.

According to a still further feature of the invention, a sliding member made of non-magnetic material is arranged between an inner peripheral surface of the magnetic path portion and an outer peripheral surface of the plunger side-gap portion, in order to prevent a direct magnetic contact between the magnetic path portion and the plunger side-gap portion.

According to a still further feature of the invention, the sliding member is formed as a separate member inserted into an insertion hole formed in the magnetic path portion at the constant overlapping area, or formed as a coating on an inner peripheral surface of the insertion hole.

Further alternatively, an annular ring member may be inserted into the insertion hole formed in the magnetic path portion at the constant overlapping area, and the sliding member is formed as a separate member inserted into the insertion hole, or formed as a coating on an inner peripheral surface of the annular ring member.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

Figure 1:
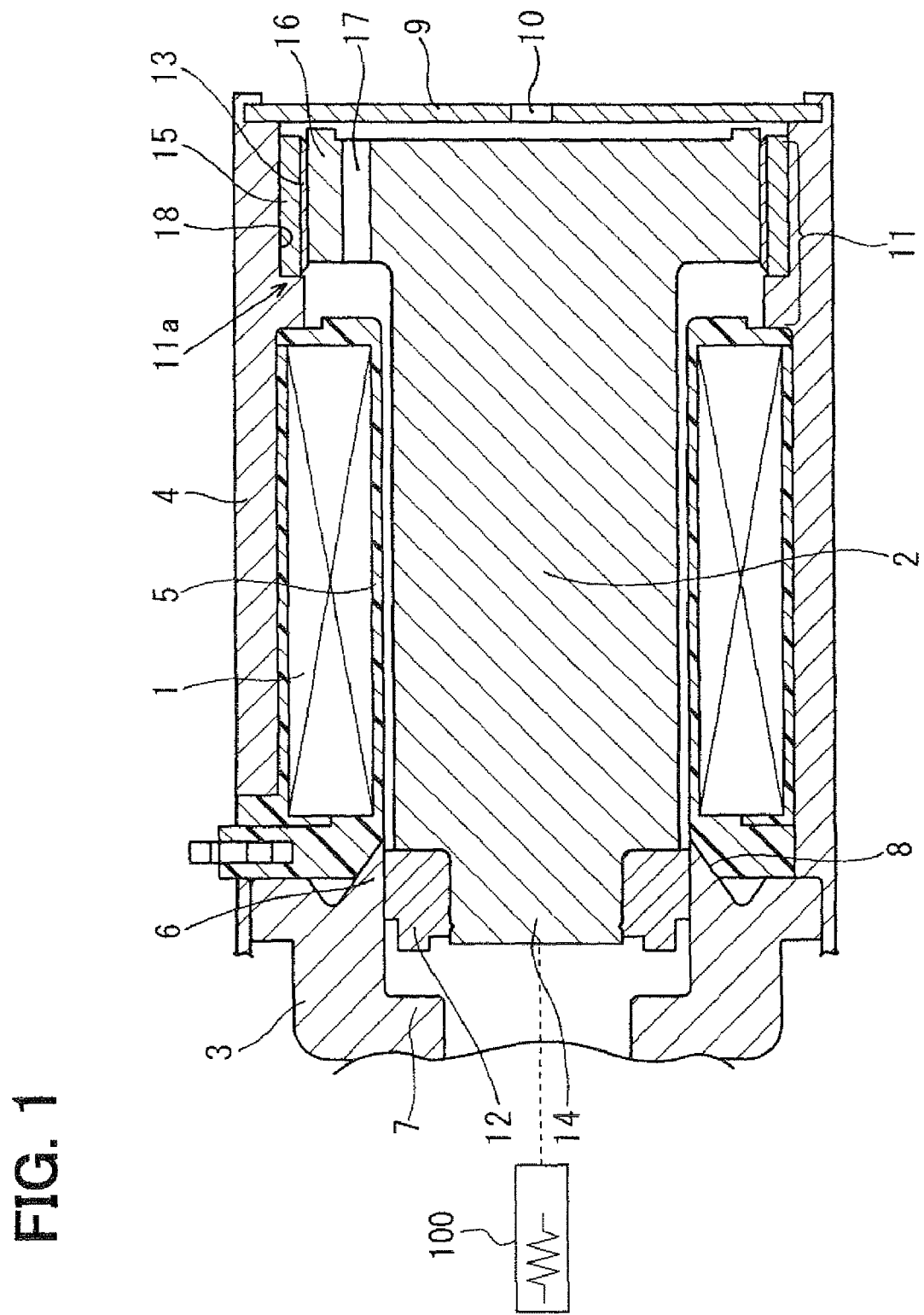
FIG. 1 is a schematic cross-sectional view showing a linear solenoid according to a first embodiment of the present invention.

An embodiment of the present invention will be explained with reference to FIGS. 1 to 3. The same reference numerals are used for identical or similar parts through multiple embodiments.

A linear solenoid has an electromagnetic coil 1 (also referred to as a coil 1) for generating electromagnetic force (also referred to as a magnetic force) upon receiving electric power, a plunger 2 which is made of magnetic material and inserted into an inside of the coil 1 so that the plunger 2 is movable in an axial direction, a main (first) magnetic pulling portion 6 which is made of magnetic material and magnetically attracts (pulls) one of axial ends of the plunger 2 toward one axial end of the solenoid by electromagnetic force generated at the coil 1, and a magnetic path portion 11 which is made of magnetic material and surrounds an outer peripheral portion at the other axial end of the plunger 2 so that magnetic flux passes through the magnetic path portion 11 in a radial direction of the plunger 2. The plunger 2 is biased toward the other axial end of the solenoid by a biasing means 100, such as a spring, fluid pressure, and so on. When the electromagnetic force is generated at the coil 1, a driving force is generated at the plunger 2 so that the plunger is driven to move toward the one axial end of the solenoid, which is opposite to the biasing force of the biasing means.

A plunger side-gap portion 16 is formed at the other axial end of the plunger 2 as a large-diameter portion, through which magnetic flux passes to the magnetic path portion 11. A sub (second) magnetic pulling portion 11a is formed at the magnetic path portion 11 for magnetically pulling the plunger side-gap portion 16 toward the one axial end by the electromagnetic force generated at the coil 1.

As above, the plunger 2 has two magnetic pulling portions, at which the plunger 2 is magnetically attracted (pulled) toward the one axial end, so that a larger magnetic pulling force can be obtained for the plunger 2 having a longer moving stroke.

First Embodiment

The linear solenoid, to which the present invention is applied, will be explained with reference to FIGS. 1 to 3. The linear solenoid according to the first embodiment may be applied to, for example, an electromagnetic pressure control valve of an automatic transmission apparatus for a vehicle, so that the linear solenoid may drive a valve device for carrying out oil-pressure control operation.

Only for the purpose of easier understanding of the invention, the one axial end, one axial side or one axial direction are hereinafter referred to as a forward (axial) end/side or a forward direction (that is, a left-hand axial end/side/direction of FIG. 1), while the other axial end/side or the other axial direction are referred to as a backward or rear (axial) end/side or a backward or rear direction (that is, a right-hand axial end/side/direction of FIG. 1).

The linear solenoid is composed of the coil 1, the plunger 2, a stator 3, a yoke 4, a connector (not shown), and so on. The stator 3 and the yoke 4 form a cylindrical solenoid housing made of magnetic material.

The coil 1 is an electromagnetic force generating unit having a wire with insulating coating, which is wound on a bobbin 5 made of resin. The coil 1 generates the electromagnetic force (magnetic force) upon receiving electric power so as to magnetically attract (pull) the plunger 2 in the forward direction. The bobbin 5 is composed of a cylindrical portion on which the coil 1 is wound, and flange portions formed at both axial ends of the cylindrical portion for holding both axial ends of the wound coil 1.

The plunger 2 is made of magnetic material (for example, iron, that is ferromagnetic material for forming a part of a magnetic circuit) and formed in a cylindrical shape. The plunger 2 is movably inserted into the inside of the bobbin 5 (that is, the inside of the solenoid), so that the plunger 2 is movable in the axial direction. The plunger 2 is magnetically attracted/pulled at the main (first) magnetic pulling portion 6, which is formed at the stator 3.

The plunger 2 may be linked to a valve member of the valve device via a shaft or the like, so that the plunger 2 may be axially moved together with the valve member. More exactly, the valve device may have a return spring (one of examples for biasing means) for biasing the valve member in the backward direction. As a result, the plunger 2 is also biased together with the valve member in the backward direction by biasing force of the return spring.

The stator 3 is made of magnetic material (for example, iron, that is ferromagnetic material for forming a part of the magnetic circuit) and formed in a ring shape. The stator 3 is firmly fixed to a valve housing of the valve device, for example by caulking, at a forward end of the cylindrical yoke 4.

The stator 3 is formed with the main magnetic pulling portion 6 for magnetically attracting (pulling) the plunger 2 in the forward direction and with a stopper portion 7 for limiting a maximum moving stroke of the plunger 2.

The main (first) magnetic pulling portion 6 has a cylindrical portion for bringing the magnetic flux to a place adjacent to the plunger 2. The main gap is formed between the cylindrical portion and the plunger 2 in the axial direction.

The cylindrical portion of the main magnetic pulling portion 6 is not in contact with the plunger 2 so that a forward end of the plunger 2 moves in the axial direction into the cylindrical portion. Therefore, the cylindrical portion partly overlaps in the radial direction with the forward end of the plunger 2. A tapered portion 8 is formed at a backward end of the cylindrical portion, so that magnetic attracting (pulling) force at the main gap may not be changed depending on a stroke amount (an axial moving amount) of the plunger 2.

The stopper 7 limits the maximum moving stroke of the plunger 2 when a sliding member 12 provided at the forward end of the plunger 2 is brought into contact with the stopper 7. In addition, when the plunger 2 is moved in the forward direction, the stopper 7 magnetically attracts (pulls) the forward end of the plunger 2, so that a possible decrease of the magnetic pulling force (which may occur when the plunger moves in the forward direction) can be prevented.

The yoke 4 is made of magnetic material (for example, iron, that is ferromagnetic material forming a part of the magnetic circuit) and formed in a cylindrical shape for surrounding an outer periphery of the coil 1. The forward end (not shown) of the yoke 4 is firmly fixed to the valve housing, as explained above.

A rear end of the yoke 4 is closed by a disc plate 9, which is made of non-magnetic material, such as bronze. The rear end of the yoke 4 is caulked to firmly attach the disc plate 9 to the yoke 4. A breathing hole 10 is formed in the disc plate 9, so that the inside of the solenoid is communicated to the outside thereof.

The magnetic path portion 11 is formed at the rear side of the yoke 4 so as to surround an outer peripheral portion of a rear side of the plunger 2 for receiving the magnetic flux from the plunger 2 in the radial direction. A side gap is formed between the magnetic path portion 11 and the rear side of the plunger 2 (the plunger side-gap portion 16), so that the magnetic flux passes through the side gap in the radial direction.

The connector (not shown) is an electrical connecting component for electrically connecting the linear solenoid to an electronic control unit (not shown) for controlling the electromagnetic pressure control valve via electric wires (the electronic control unit is also referred to as AT-ECU). Terminals (not shown), which are respectively connected to both ends of the coil 1, are embedded in the connector.

The electronic control unit (AT-ECU) controls power supply to the coil 1 with, for example, a duty ratio control, so that displacement of the plunger 2 in the axial direction is linearly controlled. As a result, opening degree of the valve member of the valve device is controlled to thereby control the oil pressure.

A major portion of the present invention will be further explained. The plunger 2 is formed in the cylindrical shape, which is movably inserted into the inside of the bobbin 5. More exactly, the plunger 2 is movably supported in the axial direction by the sliding member 12 provided at the forward end of the plunger 2 as well as a sliding member 13 provided at the rear end of the plunger 2.

The sliding member 12 is made of non-magnetic material (for example, bronze, fluoroplastic, and so on) and formed in the ring shape. The sliding member 12 is press-fitted to an outer periphery of a boss portion 14 formed at the forward end of the plunger 2 and projecting in the forward direction. The sliding member 12 prevents the plunger 2 from being in direct magnetic contact with the stator 3.

The sliding member 13 is likewise made of the non-magnetic material (for example, bronze, fluoroplastic, and so on) and formed on an inner peripheral surface of an annular ring member 15. The sliding member 13 may be formed as a coating made of the non-magnetic material (bronze, fluoroplastic, and so on). The annular ring member 15 is made of magnetic material (for example, iron, that is ferromagnetic material forming a part of the magnetic circuit) and press-inserted into an inner peripheral surface of an insertion hole 18 formed in the magnetic path portion 11. The sliding member 13 supports in a slidable manner the outer peripheral surface of the plunger side-gap portion 16, which is formed at the rear end of the plunger 2. The sliding member 13 prevents the plunger side-gap portion 16 from being in direct magnetic contact with the magnetic path portion 11.

A breathing hole 17 is formed in a flanged portion of the plunger side-gap portion 16 in the axial direction.

The magnetic path portion 11 and the plunger side-gap portion 16 are formed at a rear side of the bobbin 5, that is, out of an axial-length area of the bobbin 5. An inner diameter of the magnetic path portion 11 as well as an outer diameter of the plunger side-gap portion 16 is made larger than a minimum inner diameter of the bobbin 5 (that is, almost equal to an outer diameter of the portion of the plunger 2 to be inserted into the bobbin 5).

The outer diameter of the plunger side-gap portion 16 is made to be close to a maximum outer diameter of the bobbin 5. More exactly, the inner diameter of the magnetic path portion 11 is defined by a minimum inner diameter of the yoke 4, and the inner diameter of the magnetic path portion 11 is made to be such a value, which is slightly smaller than the maximum outer diameter of the bobbin 5.

Figure 2:
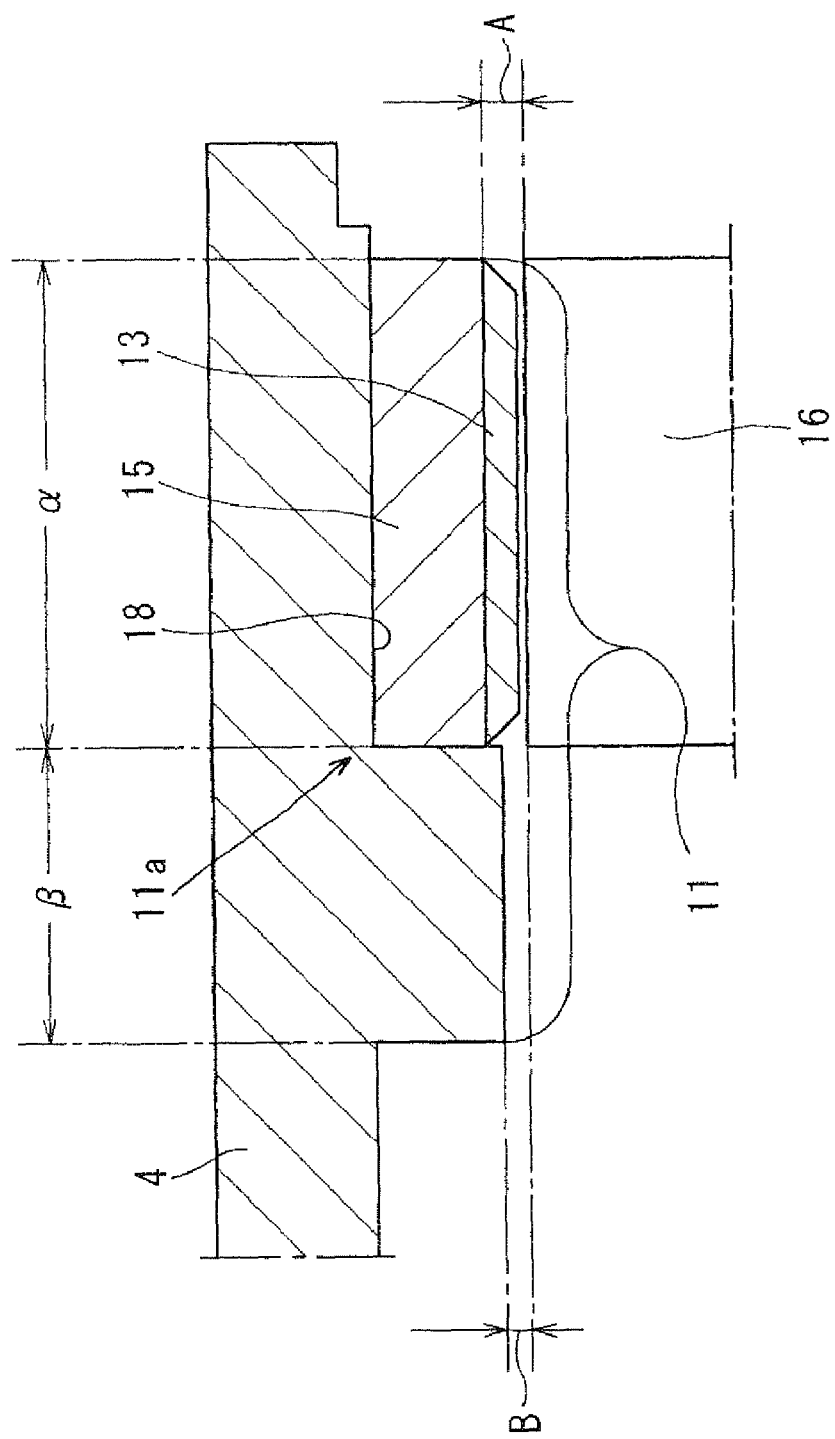
FIG. 2 is a schematic enlarged cross-sectional view showing a major portion of the linear solenoid.

As shown in FIG. 2, the sub (second) magnetic pulling portion 11a is formed as a part of the magnetic path portion 11, so that the sub magnetic pulling portion 11a magnetically pulls the plunger side-gap portion 16 in the forward direction by the magnetic force generated at the coil 1. For the purpose of explanation, the inner peripheral surface of the magnetic path portion 11 is divided into two parts. The first part is defined as a constant overlapping area "α" which overlaps with the plunger side-gap portion 16 in the radial direction when the plunger 2 is positioned at its most backward position (that is, a position of the plunger 2 when electric power supply to the coil 1 is cut off). The second part is defined as a temporal overlapping area "β" which overlaps with the plunger side-gap portion 16 in the radial direction when the plunger 2 is moved in the forward direction. The temporal overlapping area "β" is increased as the plunger 2 is moved further in the forward direction.

A magnetic gap, which is formed in the constant overlapping area "α" and between the magnetic path portion 11 and the plunger side-gap portion 16 in the radial direction of the plunger 2, is defined as a first radial gap A. A magnetic gap, which is formed in the temporal overlapping area "β" and between the magnetic path portion 11 and the plunger side-gap portion 16 in the radial direction of the plunger 2, is defined as a second radial gap B. And the first radial gap A is made to be larger than the second radial gap B (namely, A>B).

As shown in FIG. 2, the plunger side-gap portion 16 is movably supported by the sliding member 13, which is provided at the inner peripheral surface of the annular ring member 15 press-inserted into the magnetic path portion 11. The insertion hole 18 is formed at the magnetic path portion 11 in the constant overlapping area "α", so that the annular ring member 15 is press-inserted into the insertion hole 18 from its rear end.

The first radial gap A is formed by a sliding gap (air gap) A1 formed between the sliding member 13 and plunger side-gap portion 16 and a thickness A2 of the sliding member 13 in the radial direction; that is, A=A1+A2.

An inner diameter of the sliding member 13 is made smaller than the inner diameter of the magnetic path portion 11 at the temporal overlapping area "β" in order to prevent the plunger side-gap portion 16 from being in direct magnetic contact with the magnetic path portion 11. The second radial gap B is formed by a sliding gap (air gap) between the magnetic path portion 11 of the temporal overlapping area "β" and the plunger side-gap portion 16.

Figure 3:
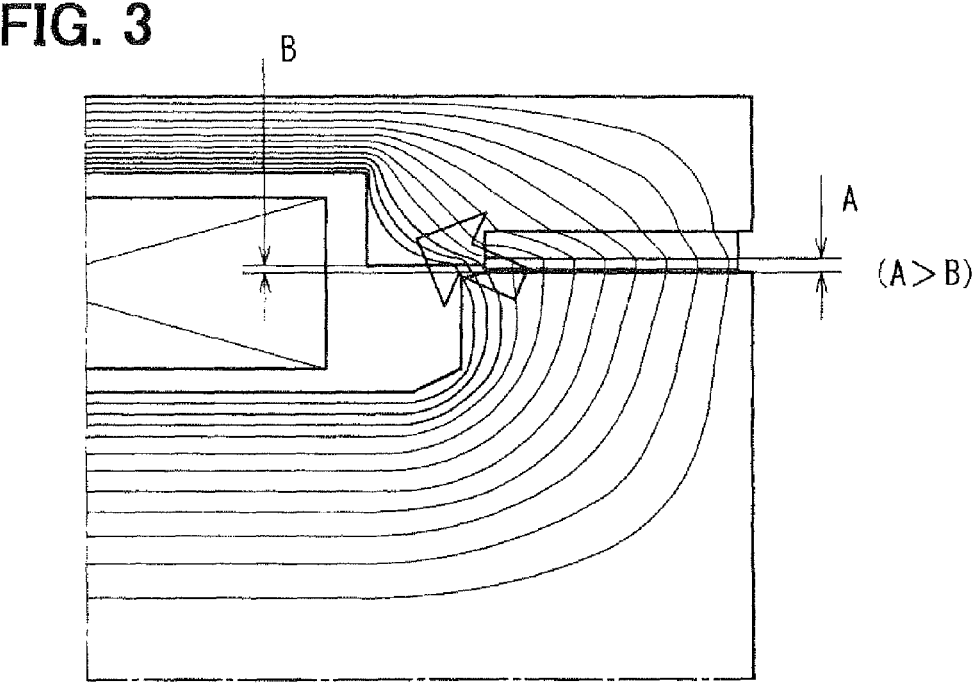
FIG. 3 is an explanatory view showing lines of magnetic force at a magnetic pulling portion.

When the magnetic force is generated at the coil 1, magnetic flux flows as shown in FIG. 3 through the magnetic circuit formed by the plunger 2, the plunger side-gap portion 16, the annular ring member 15, the yoke 4, the stator 3, and so on. As indicated by an arrow in FIG. 3, lines of magnetic force are generated between the magnetic path portion 11 of the temporal overlapping area "β" and the plunger side-gap portion 16, so that the plunger side-gap portion 16 is pulled by such magnetic force in the forward direction. As above, the sub (second) magnetic pulling portion 11a is formed at the magnetic path portion 11 for magnetically pulling the plunger 2 in the forward direction.

According to the linear solenoid of the first embodiment, not only the main (first) magnetic pulling portion 6 is formed for magnetically pulling the forward end of the plunger 2 in the forward direction, but also the sub (second) magnetic pulling portion 11a is formed at the magnetic path portion 11 for magnetically pulling the plunger side-gap portion 16 (that is, the plunger 2) in the forward direction. In other words, according to the linear solenoid of the first embodiment, magnetic pulling force for magnetically pulling the plunger 2 in the forward direction is generated at not only the main gap between the main magnetic pulling portion 6 and the plunger 2 but also the side gap between the magnetic path portion 11 and the plunger side-gap portion 16.

Figure 10:
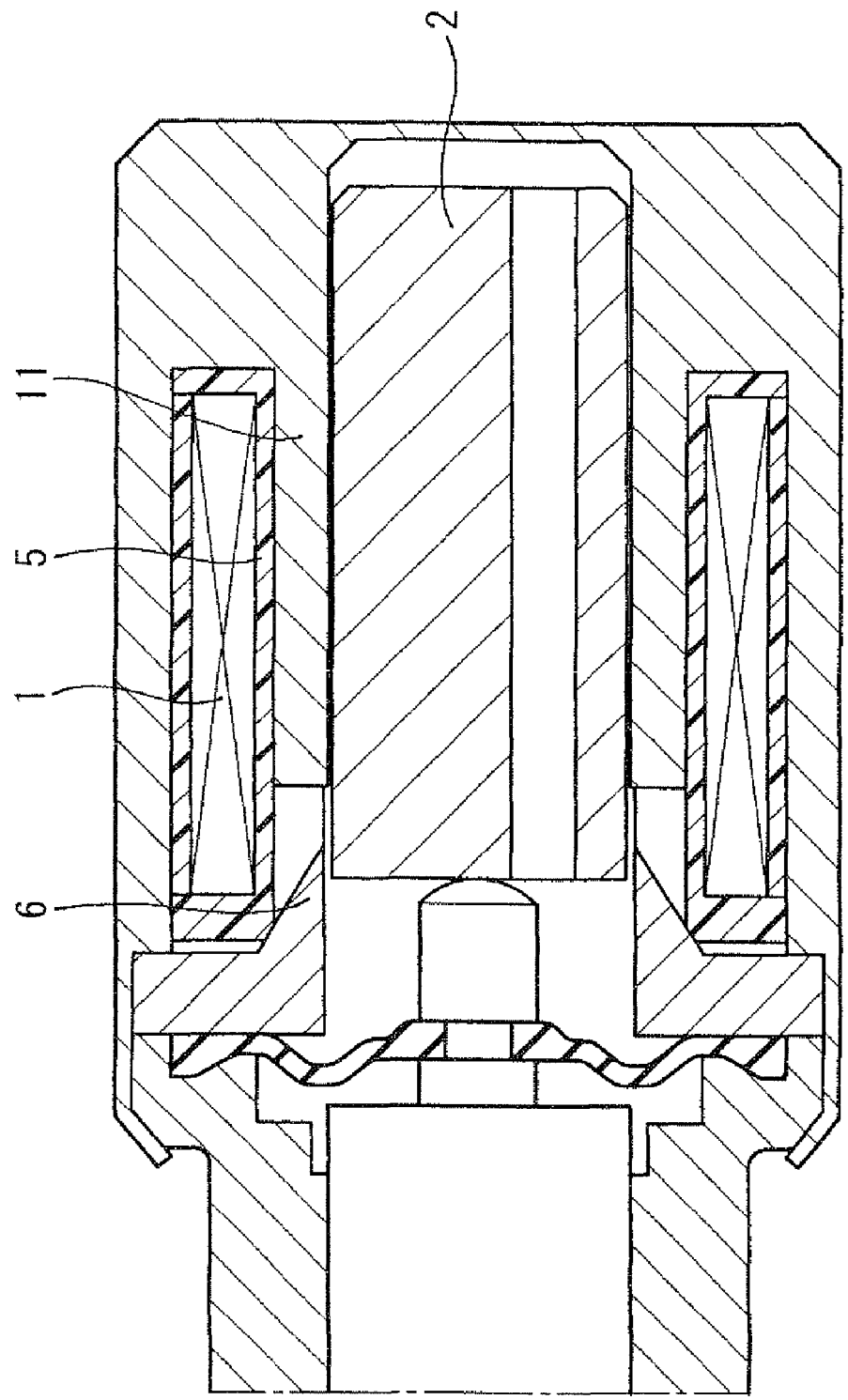
FIG. 10 is a schematic cross-sectional view showing a linear solenoid according to a related art.

In addition, since the inner diameter of the magnetic path portion 11 as well as the outer diameter of the plunger side-gap portion 16 is made larger than the minimum inner diameter of the bobbin 5, a peripheral length of the plunger side-gap portion 16 for receiving the magnetic pulling force is made larger than that of the conventional solenoid (e.g. FIG. 10). As a result, total amount of the magnetic pulling force in the axial direction becomes larger at the plunger side-gap portion 16. Namely, the magnetic pulling force at the plunger side-gap portion 16 for magnetically pulling the plunger in the forward direction can be increased.

In the conventional linear solenoid, the magnetic pulling force for pulling the plunger 2 in the forward direction is only generated at one position, that is, at the forward end of the plunger 2. According to the above embodiment of the present invention, the number of positions, at which the magnetic pulling force is generated, is increased to two positions, that is, at both axial ends of the plunger 2. In addition, the magnetic pulling force can be increased for the linear solenoid having a longer moving stroke for the plunger 2. In other words, the driving force can be increased for the valve device, in the case that the size of the valve device is maintained as it is. Alternatively, the valve device can be further miniaturized in the case that driving force for the valve device is maintained unchanged.

Second Embodiment

Figure 4:
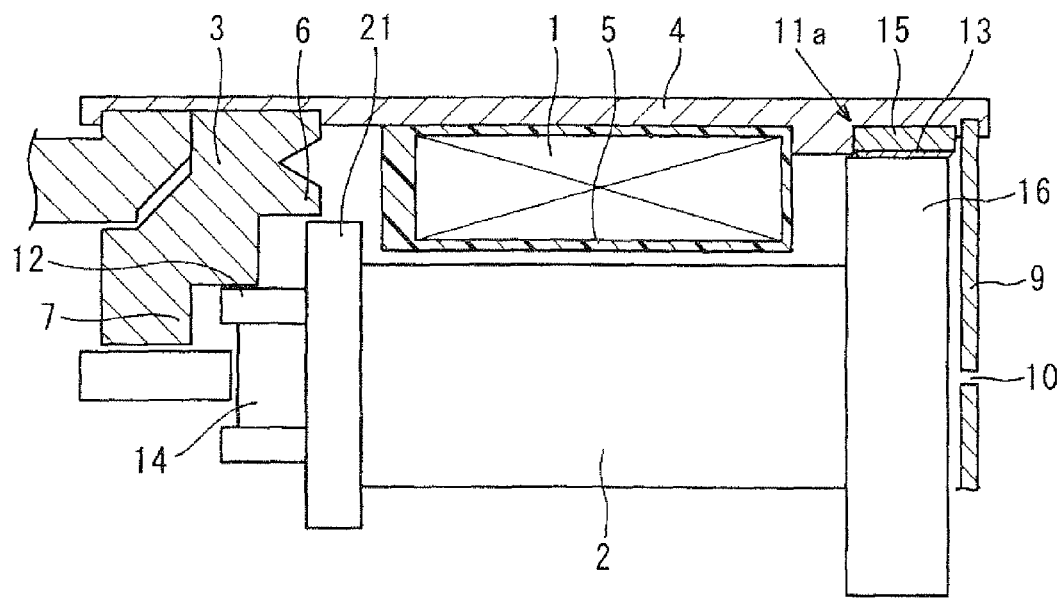
FIG. 4 is a schematic cross-sectional view showing a linear solenoid according to a second embodiment of the present invention.

A second embodiment of the present invention will be explained with reference to FIG. 4. In FIG. 4, the same reference numerals to the first embodiment designate the same or similar parts or components having the same or similar function.

According to the second embodiment, a large-diameter portion 21 made of magnetic material is provided at the forward end of the plunger 2, so that the magnetic pulling force at the main gap is increased.

More exactly, the main magnetic pulling portion 6 as well as the large-diameter portion 21 is formed at the forward side of the bobbin 5, which is out of a longitudinal-length area of the bobbin 5. An inner diameter of the main magnetic pulling portion 6 and an outer diameter of the large-diameter portion 21 are made to be larger than the minimum inner diameter of the bobbin 5.

According to the above structure, a peripheral length of the plunger 2 at the forward end (that is, the large-diameter portion 21), at which the magnetic pulling force is received, becomes larger. Accordingly, the magnetic saturation may be unlikely to occur at the forward end of the plunger 2 (that is, the portion for receiving the magnetic pulling force at the main gap). As a result, the magnetic pulling force for magnetically pulling the plunger 2 in the forward direction is increased.

Third Embodiment

Figure 5:
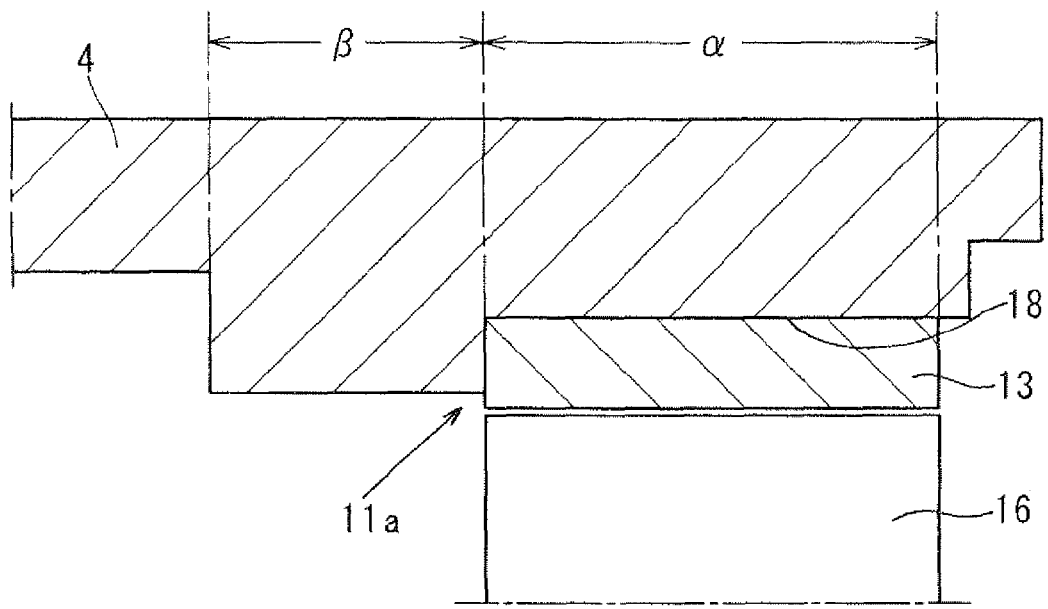
FIG. 5 is a schematic enlarged cross-sectional view showing a major portion of a linear solenoid according to a third embodiment.

A third embodiment of the present invention will be explained with reference to FIG. 5.

In the above first embodiment, the sliding member 13 is formed at the inner peripheral surface of the annular ring member 15, and the annular ring member 15 is press-inserted into the magnetic path portion 11 at the constant overlapping area "α". As a result, the sliding member 13 is provided at the constant overlapping area "α" of the magnetic path portion 11.

According to the third embodiment, however, the annular ring member 15 is eliminated. The sliding member 13 made of the non-magnetic material (for example, non-magnetic metal such as bronze, resin such as fluoroplastic, and so on) is press-inserted into the inner peripheral surface of the magnetic path portion 11 at the constant overlapping area "α" (more exactly, inserted into the insertion hole 18 formed at the constant overlapping area "α").

Fourth Embodiment

Figure 6:
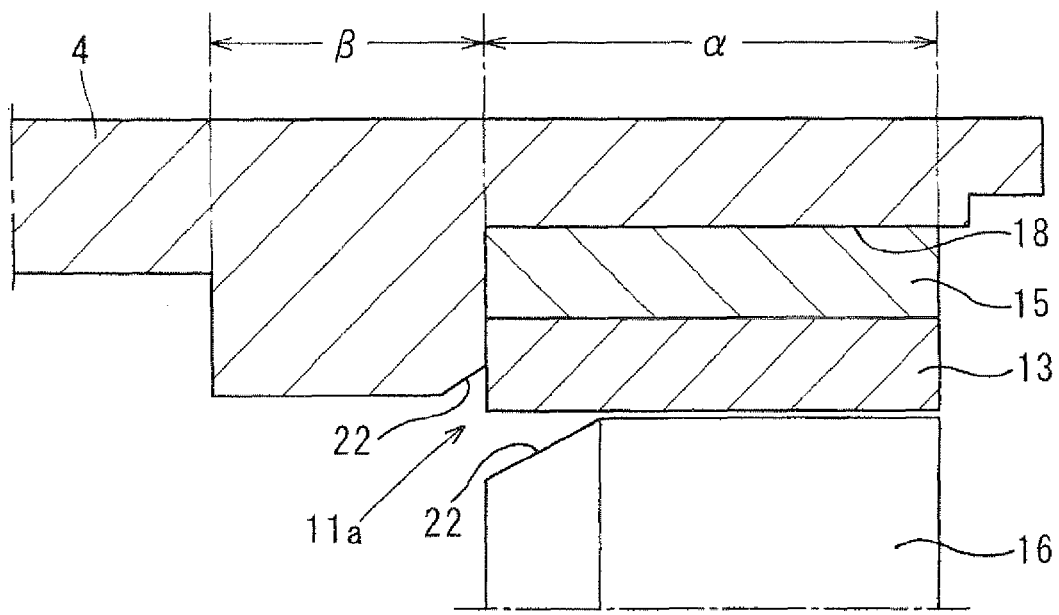
FIG. 6 is a schematic enlarged cross-sectional view showing a major portion of a linear solenoid according to a fourth embodiment.

A fourth embodiment of the present invention will be explained with reference to FIG. 6.

According to the fourth embodiment, a tapered portion 22 is formed at least either at the rear end of the magnetic path portion 11 at the temporal overlapping area "β", or at a forward end of the plunger side-gap portion 16, in order to control the magnetic pulling force in the axial direction at the side gap with respect to the moving stroke of the plunger 2. For example, the magnetic pulling force at the side gap is so controlled as to be not changed depending on the moving stroke of the plunger 2.

Fifth Embodiment

Figure 7:
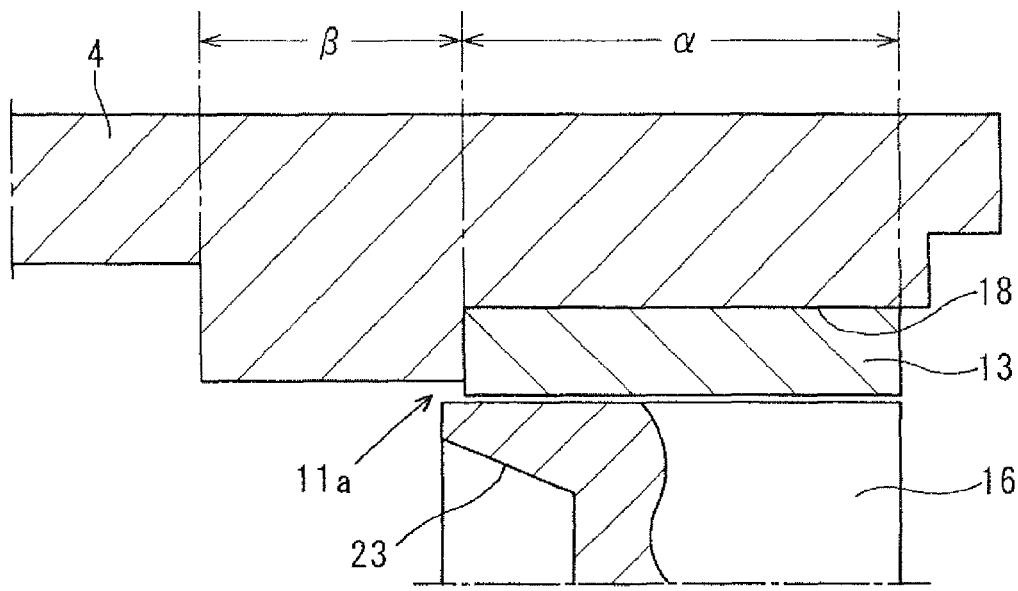
FIG. 7 is a schematic enlarged cross-sectional view showing a major portion of a linear solenoid according to a fifth embodiment.

A fifth embodiment of the present invention will be explained with reference to FIG. 7.

According to the fifth embodiment, an annular recessed portion is formed at the forward end of the plunger side-gap portion 16, and a tapered portion 23 is formed at the recessed portion so that a thickness in a radial direction of an annular forward end of the plunger side-gap portion 16 is gradually increased from the forward end toward a bottom of the recessed portion. With such tapered portion 23, change of the magnetic pulling force at the side gap is controlled with respect to the moving stroke of the plunger 2.

Sixth Embodiment

Figure 8:
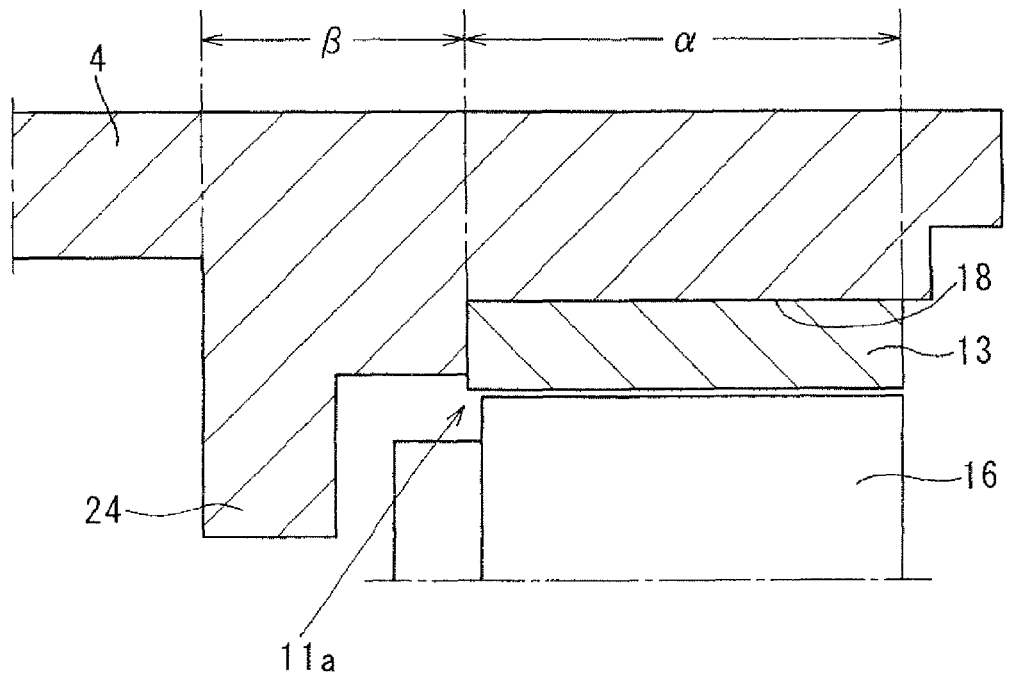
FIG. 8 is a schematic enlarged cross-sectional view showing a major portion of a linear solenoid according to a sixth embodiment.

A sixth embodiment of the present invention will be explained with reference to FIG. 8.

According to the sixth embodiment, a projected portion 24 is formed at the temporal overlapping area "β" of the magnetic path portion 11, so that the projected portion 24 faces to the plunger side-gap portion 16 in the axial direction.

With such structure, when the magnetic force is generated at the coil 1, the plunger side-gap portion 16 is magnetically pulled by the projected portion 24. As a result, a larger driving force in the forward direction is generated at the plunger side-gap portion 16. Therefore, the linear solenoid can be further miniaturized and increased in its output.

Seventh Embodiment

Figure 9:
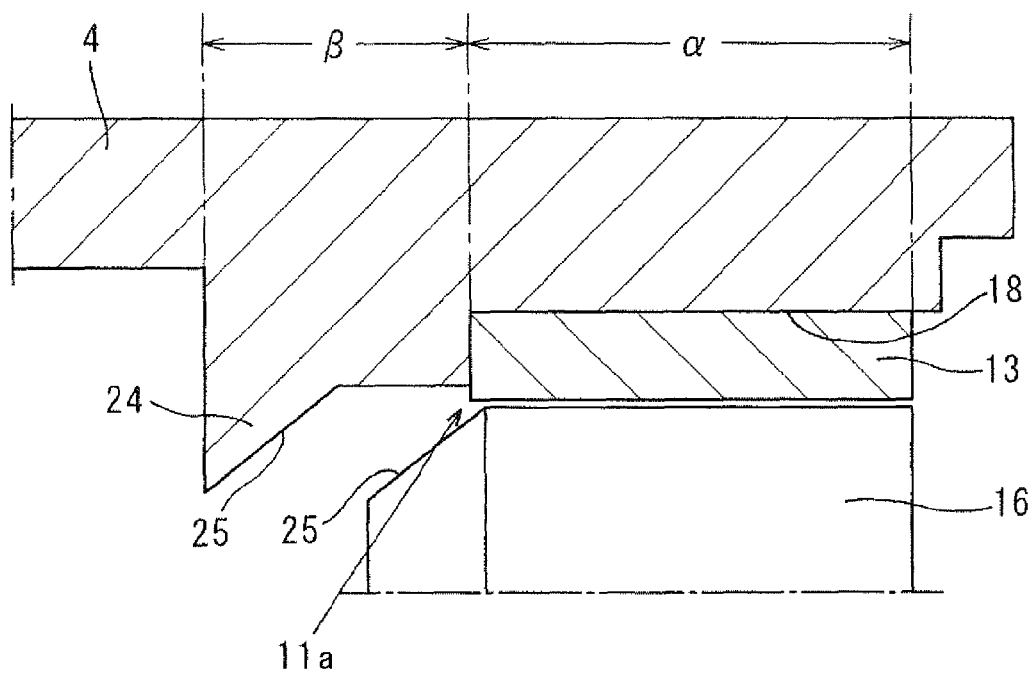
FIG. 9 is a schematic enlarged cross-sectional view showing a major portion of a linear solenoid according to a seventh embodiment.

A seventh embodiment of the present invention will be explained with reference to FIG. 9.

In the above sixth embodiment (FIG. 8), a rear end surface of the projected portion 24 and a forward end surface of the plunger side-gap portion 16 face to each other, wherein both of them are perpendicular to the axis of the plunger 2.

According to the seventh embodiment, a tapered portion 25 is formed at the rear end surface of the projected portion 24 and/or at the forward end surface of the plunger side-gap portion 16, so that the change of the magnetic pulling force at the side gap is controlled with respect to the moving stroke of the plunger 2.

In the above embodiments, the linear solenoid is applied to the electromagnetic pressure control valve of the automatic transmission apparatus. The present invention can be applied to the linear solenoid for the electromagnetic pressure control valve for other purposes than the automatic transmission apparatus, for example, for actuators of OCV (Oil Control Valve) to be used for VVT (Variable Valve Timing) control apparatus.

Furthermore, in the above embodiments, the present invention is applied to the linear solenoid for driving the valve device. The present invention may be further applied to a linear solenoid, which directly or indirectly drives another device than the valve device.

What is claimed is:

1. A linear solenoid comprising:
   a cylindrical solenoid housing made of magnetic material;
   a cylindrical electromagnetic coil supported in the solenoid housing for generating magnetic force when electric power is supplied thereto;
   a plunger made of magnetic material and movably inserted into an inside of the coil so that the plunger is movable in its axial direction, the plunger being biased by a biasing means in a backward direction thereof;
   a first magnetic pulling portion made of magnetic material and formed at a forward end of the solenoid housing for magnetically pulling a forward end of the plunger in a forward direction when the magnetic force is generated at the coil; and
   a magnetic path portion formed at a rear end of the solenoid housing and surrounding an outer periphery of a rear end portion of the plunger so that magnetic flux passes in a radial direction of the plunger from the rear end portion to the magnetic path portion,
   wherein a plunger side-gap portion is formed at the rear end portion of the plunger so that the magnetic flux passes in the radial direction of the plunger from the plunger side-gap portion to the magnetic path portion, and
   a second magnetic pulling portion is formed at the magnetic path portion for magnetically pulling the plunger side-gap portion in the forward direction when the magnetic force is generated at the coil,
   wherein the magnetic path portion comprises:
   a constant overlapping area which overlaps with the plunger side-gap portion in the radial direction, when the plunger is in its rear-most position; and
   a temporal overlapping area which overlaps with the plunger side-gap portion in the radial direction, when the plunger is moved in the forward direction, wherein the temporal overlapping area is increased as the plunger is further moved in the forward direction,
   wherein a first radial gap is formed in the radial direction between the magnetic path portion of the constant overlapping area and the plunger side-gap portion, wherein a second radial gap is formed in the radial direction between the magnetic path portion of the temporal overlapping area and the plunger side-gap portion, and wherein the first radial gap is made larger than the second radial gap.

2. The linear solenoid according to the claim 1, wherein the plunger side-gap portion is provided at a position, which is out of an axial-length area of a bobbin for the coil in the axial direction, and an outer diameter of the plunger side-gap portion is made to be equal to or larger than a minimum inner diameter of the bobbin.

3. The linear solenoid according to the claim 2, wherein the outer diameter of the plunger side-gap portion is made to be close to a maximum outer diameter of the bobbin.

4. The linear solenoid according to the claim 1, wherein a projected portion is formed at the magnetic path portion of the temporal overlapping area, so that the projected portion faces to the plunger side-gap portion in the axial direction, and the plunger side-gap portion is magnetically pulled by the projected portion, when the magnetic force is generated at the coil.

5. The linear solenoid according to the claim 1, wherein a tapered portion is formed at the magnetic path portion of the temporal overlapping area or at a forward end of the plunger side-gap portion, such that a thickness of the tapered portion in the radial direction is changed in the axial direction.

6. The linear solenoid according to the claim 1, wherein an outer diameter of the forward end of the plunger, which is magnetically pulled by the first magnetic pulling portion, is made to be equal to or larger than a minimum inner diameter of a bobbin for the coil.

7. The linear solenoid according to the claim 1, wherein a sliding member made of non-magnetic material is arranged between an inner peripheral surface of the magnetic path portion and an outer peripheral surface of the plunger side-gap portion, in order to prevent a direct magnetic contact between the magnetic path portion and the plunger side-gap portion.

8. The linear solenoid according to the claim 7, wherein the sliding member is formed as a separate member inserted into an insertion hole formed in the magnetic path portion at the constant overlapping area, or formed as a coating on an inner peripheral surface of the insertion hole.

9. The linear solenoid according to the claim 1, wherein an annular ring member is inserted into an insertion hole formed in the magnetic path portion at the constant overlapping area, and a sliding member made of non-magnetic material is arranged between an inner peripheral surface of the annular ring member and an outer peripheral surface of the plunger side-gap portion, in order to prevent a direct magnetic contact between the magnetic path portion and the plunger side-gap portion.

10. The linear solenoid according to the claim 9, wherein the sliding member is formed as a separate member inserted into the annular ring member or formed as a coating on an inner peripheral surface of the annular ring member.

* * * * *